(12) United States Patent
Steidl et al.

(10) Patent No.: US 7,501,472 B2
(45) Date of Patent: *Mar. 10, 2009

(54) AQUEOUS FLUOROMODIFIED POLYURETHANE SYSTEM FOR ANTI-GRAFFITI AND ANTI-SOILING COATINGS

(75) Inventors: Norbert Steidl, Kienberg (DE); Alois Maier, Engelsberg (DE); Franz Wolfertstetter, Palling (DE); Wolfgang Hiller, Tübingen (DE); Rupert Stadler, Mindelheim (DE)

(73) Assignee: Construction Research & Technology GmbH, Trostberg (DE)

( * ) Notice: Subject to any disclaimer, the term of this patent is extended or adjusted under 35 U.S.C. 154(b) by 73 days.

This patent is subject to a terminal disclaimer.

(21) Appl. No.: 10/485,617

(22) PCT Filed: Feb. 26, 2003

(86) PCT No.: PCT/EP03/01971

§ 371 (c)(1),
(2), (4) Date: Jan. 29, 2004

(87) PCT Pub. No.: WO03/072667

PCT Pub. Date: Sep. 4, 2003

(65) Prior Publication Data

US 2004/0192835 A1     Sep. 30, 2004

(30) Foreign Application Priority Data

Feb. 27, 2002   (DE) ................... 102 08 567

(51) Int. Cl.
  *C08J 3/03*     (2006.01)
  *C08G 18/10*    (2006.01)
  *C08G 18/12*    (2006.01)
  *C08G 18/32*    (2006.01)
  *C09D 175/04*   (2006.01)

(52) U.S. Cl. ............. 524/591; 524/839; 524/840; 528/49; 528/70; 528/71

(58) Field of Classification Search ......... 524/591, 524/839, 840; 528/49, 70, 71
See application file for complete search history.

(56) References Cited

U.S. PATENT DOCUMENTS

| | | | |
|---|---|---|---|
| 4,636,545 A | | 1/1987 | Koenig et al. |
| 4,983,666 A * | | 1/1991 | Zavatteri et al. ............ 524/539 |
| 5,039,739 A * | | 8/1991 | Padget et al. ............... 524/839 |
| 5,064,926 A * | | 11/1991 | Federici et al. ............... 528/49 |
| 5,214,121 A * | | 5/1993 | Mosch et al. ................. 528/49 |
| 5,254,660 A * | | 10/1993 | Kirchmeyer et al. .......... 528/49 |
| 5,350,795 A * | | 9/1994 | Smith et al. ................. 524/507 |
| 5,605,956 A * | | 2/1997 | Anton et al. ................. 524/590 |
| 5,672,673 A * | | 9/1997 | Kirchmeyer et al. .......... 528/70 |
| 5,674,951 A * | | 10/1997 | Hargis et al. ................ 525/410 |
| 5,703,194 A | | 12/1997 | Malik et al. |
| 5,731,095 A * | | 3/1998 | Milco et al. ................. 428/482 |
| 5,827,919 A * | | 10/1998 | May ........................... 524/590 |
| 6,034,207 A * | | 3/2000 | Koike et al. ................. 528/402 |
| 6,224,782 B1 * | | 5/2001 | Allewaert et al. .......... 252/8.62 |
| 6,261,695 B1 * | | 7/2001 | Kirimoto .................. 428/423.7 |
| 6,306,958 B1 * | | 10/2001 | Dirschl et al. .............. 524/805 |
| 6,376,592 B1 * | | 4/2002 | Shimada et al. ............. 524/457 |
| 6,437,077 B1 * | | 8/2002 | Danner ....................... 528/73 |
| 6,465,565 B1 * | | 10/2002 | Garcia et al. ............... 524/591 |
| 6,479,612 B1 * | | 11/2002 | Del Pesco et al. ........... 528/70 |
| 7,265,178 B2 * | | 9/2007 | Maier et al. ................. 524/507 |

FOREIGN PATENT DOCUMENTS

| | | |
|---|---|---|
| EP | 0 339 862 A | 11/1989 |
| EP | 1 162 220 A | 12/2001 |
| JP | 09 118843 A | 5/1997 |
| WO | WO-02 04538 A | 1/2002 |

* cited by examiner

Primary Examiner—Rabon Sergent
(74) Attorney, Agent, or Firm—Fulbright & Jaworski LLP

(57) ABSTRACT

An aqueous fluoromodified polyurethane system for one- or two-component anti-graffiti and anti-soiling coatings is prepared by (a) preparing a binder component based on an aqueous solution or dispersion of optionally hydroxy- and/or amino-functional oligourethanes and/or polyurethanes having fluorinated side chains, and, optionally, (b) subsequently reacting the binder component with a crosslinker.

29 Claims, No Drawings

AQUEOUS FLUOROMODIFIED POLYURETHANE SYSTEM FOR ANTI-GRAFFITI AND ANTI-SOILING COATINGS

This is a §371 of PCT/EP03/01971 filed Feb. 26, 2003 which claims priority from German 102 08 567.6 filed Feb. 27, 2002, each of which are hereby incorporated by reference in their entireties.

The present invention relates to an aqueous fluoromodified one- or two-component polyurethane system for antigraffiti and antisoiling coatings, based on an aqueous solution or dispersion of optionally hydroxy- and/or amino-functional oligourethanes and/or polyurethanes having fluorinated side chains as binder component and optionally water-emulsifiable polyisocyanates as crosslinker component, and to its use.

The majority of polymer high-performance coating materials, although having very good mechanical properties, possess high surface energies. Through targeted chemical modification of these systems with fluorinated building blocks it is possible to combine the specific surface properties of the fluorinated materials with the individual properties of the base polymers or copolymers. It proves advantageous here that often only small amounts of the expensive fluoro compounds are needed in order to achieve the desired surface properties.

The increase in demand for soil-repellent, weathering-resistant coatings has led in recent times to the development of new fluoropolymers for coating systems that no longer have the disadvantages of conventional fluoropolymers. This new generation of fluorocarbon-based polymers for coating systems are soluble in common organic solvents, can be cured even at standard temperature, and exhibit improved compatibility with commercial curing agents.

Within coating technology increasing importance has been attached in recent years to environmental aspects, including that relating to compliance with existing emissions guidelines. A particularly urgent concern is to reduce the amounts of volatile organic solvents (VOCs, volatile organic compounds) used in coating systems.

The binder class of the aqueous or water-based polyurethanes, as an alternative to conventional solvent-based polyurethane systems, has been known for more than 40 years. The profile of properties of the aqueous polyurethanes has been continuously improved in the decades gone by, as forcefully evidenced by a multiplicity of patents and publications on this topic area. On the chemistry and technology of water-based polyurethanes reference may be made to D. Dieterich, K. Uhlig in *Ullmann's Encyclopedia of Industrial Chemistry, Sixth Edition* 2001 *Electronic Release*. Wiley-VCH; D. Dieterich in *Houben-Weyl, Methoden der Organischen Chemie*. Vol. E20, H. Bartl, J. Falbe (eds.), Georg Thieme Verlag, Stuttgart 1987, p. 1641 ff.; D. Dieterich, Prog. Org. Coat. 9 (1981) 281-330; J. W. Rosthauser, K. Nachtkamp, Journal of Coated Fabrics 16 (1986) 39-79; R. Arnoldus, Surf. Coat. 3 (Waterborne Coat.) (1990), 17998.

Aqueous two-component polyurethane systems with low cosolvent content or featuring extreme VOC reduction, which in view of their high level of properties are of great importance in coating systems, have since come, in conjunction with water-emulsifiable polyisocyanate curing systems for chemical postcrosslinking, to represent an alternative to the corresponding solventborne systems.

Water-based copolymer dispersions or emulsions based on monomers containing perfluoroalkyl groups, have been known for a fairly long time. They are used for the hydrophobicization and oleophobicization, particularly of textiles or carpets, both alone and in conjunction with other textile assistants, provided the perfluoroalkyl groups are linear and contain at least 6 carbon atoms.

For the preparation of these copolymer dispersions and emulsions via emulsion polymerization a variety of emulsifier systems are used and, depending on the nature of the emulsifier system used, anionically or cationically stabilized copolymer dispersions or emulsions are obtained which have different performance properties.

Aqueous dispersions of graft copolymers containing perfluoroalkyl groups and their use as hydrophobicizing and oleophobicizing agents have already been known from the patent literature for some time.

EP 0 452 774 A1 and DE 34 07 362 A1 describe a process for preparing aqueous dispersions of copolymers and/or graft copolymers from ethylenically unsaturated perfluoroalkyl monomers and non-fluoromodified ethylenically unsaturated monomers, using aqueous, emulsifier-free polyurethane dispersions as the graft base.

DE 36 07 773 C2 describes polyurethanes which contain perfluoroalkyl ligands and which are used in the form of an aqueous dispersion, but using external emulsifiers, or in the form of a solution in an organic solvent (mixture), exclusively for the treatment of textile materials and of leather.

Polyurethanes containing perfluoroalkyl groups for the oleophobic and hydrophobic treatment of textiles are also described in patents DE 14 68 295 A1, DE 17 94 356 A1, DE 33 19 368 A1, EP 0 103 752 A1, U.S. Pat. Nos. 3,398,182 B1, 3,484,281 B1 and 3,896,251 B1.

These compounds, however, require large quantities for application and exhibit inadequate adhesion to the substrate.

WO 99/26992 A1 describes aqueous fluoro- and/or silicone-modified polyurethane systems having low surface energies, which cure to water-stable and solvent-stable, hard polyurethane films having anti-fouling properties. The claims therein embrace the following two perfluoroalkyl components:

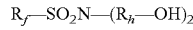

(where $R_f$=perfluoroalkyl group having 1-20 carbon atoms and $R_h$=alkyl group having 1-20 carbon atoms) and

(where $R_f$=$C_4$-$C_6$ fluoroalkyl, $R'_f$=$C_1$-$C_3$ fluoroalkyl, and R=$C_1$-$C_2$ alkyl)

Water-dispersible sulfo-polyurethane or sulfo-polyurea compositions with low surface energy, especially for ink-absorbing coatings, are described in EP 0 717 057 B1, the hydrophobic segments being composed of polysiloxane segments or of a saturated fluoroaliphatic group having 6-12 carbon atoms, of which at least 4 are fully fluorinated.

Aqueous dispersions of water-dispersible polyurethanes having perfluoroalkyl side chains, without the use of external emulsifiers, are described in EP 0 339 862 A1. The isocyanate-reactive component used there is a fluorinated polyol obtained by free radical addition of a polytetramethylene glycol with a fluorinated olefin (see EP 0 260 846 A1). The polyurethane dispersions obtained, however, all possess solids contents of less than 30% by weight and, moreover, require considerable amounts of hydrophilic component. The surface energies of the dried films are still >30 dyne cm$^{-1}$.

The present invention was based, therefore, on the object of developing a system for antigraffiti and antisoiling coatings having improved material properties and application properties taking into account environmental, economic, and physiological factors.

This object has been achieved in accordance with the invention through the provision of an aqueous, soil-repellent, one- or two-component polyurethane system having fluorinated side chains. The system comprises a binder component and optionally a crosslinker component. The system of the invention is obtainable by (a) preparing a binder component based on an aqueous solution or dispersion of low molecular mass, hydroxyl- and/or amino-functional oligo- and/or polyurethanes, for which ($a_1$) from 2.5 to 12 parts by weight of a fluoromodified polyol component (A)(i) having two or more isocyanate-reactive hydroxyl groups and an average molecular mass of from 500 to 2000 daltons, from 10 to 50 parts by weight of a high molecular mass polyol component (A) (ii) having two or more polyisocyanate-reactive hydroxyl groups and an average molecular mass of from 500 to 6000 daltons, and from 0 to 10 parts by weight of a low molecular mass polyol component (A) (iii) having two or more polyisocyanate-reactive hydroxyl groups and an average molecular mass of from 50 to 499 daltons are reacted with from 2 to 30 parts by weight of a polyisocyanate component (B), composed of at least one polyisocyanate, polyisocyanate derivative or polyisocyanate homolog having two or more aliphatic or aromatic isocyanate groups, with the addition of from 0 to 25 parts by weight of a solvent component (C) composed of an inert organic solvent, optionally in the presence of a catalyst, ($a_2$) the polyurethane preadduct from stage ($a_1$) is reacted, optionally in the presence of a catalyst, with from 1 to 10 parts by weight of a low molecular mass, anionically modifiable polyol component or polyamine component (A) (iv) having two or more polyisocyanate-reactive hydroxyl and/or amino groups and one or more inert carboxylic and/or sulfonic acid groups, some or all of which can be converted by means of bases into carboxylate and/or sulfonate groups, respectively, or are already in the form of carboxylate and/or sulfonate groups, having an average molecular mass of from 100 to 1000 daltons and/or with from 0 to 20 parts by weight of a polymeric diol component (A) (v) having two or more polyisocyanate-reactive hydroxyl groups and further, polyisocyanate-inert, hydrophilic groups, having a molecular mass of from 500 to 5000 daltons, ($a_3$) some or all of the free isocyanate groups of the polyurethane prepolymer from stage ($a_2$) are reacted with from 0 to 15 parts by weight of a polyfunctional chain terminator component (D) having three or more isocyanato-reactive hydroxyl and/or primary and/or secondary amino groups and an average molecular mass of from 50 to 500 daltons, of which one reacts with the polyurethane preadduct, ($a_4$) the polyfunctional polyurethane oligomer or polymer from stage ($a_3$) is admixed, for neutralization of some or all of the acid groups, with from 0.1 to 10 parts by weight of a neutralizing component (E), and then ($a_5$) the neutralized polyurethane oligomer or polymer from stage ($a_4$) is dispersed in from 40 to 120 parts by weight of water, which may also contain from 0 to 50 parts by weight of a formulating component (F), and ($a_6$) the only partly chain-terminated polyurethane oligomer or polymer from stage ($a_5$) is further reacted with from 0 to 10 parts by weight of a chain extender component (G) having two or more isocyanato-reactive primary and/or secondary amino groups and a molecular mass of from 50 to 500 daltons, and, optionally, (b) subsequently reacting the binder component from stages ($a_4$), ($a_5$) or ($a_6$) with from 20 to 100 parts by weight of a crosslinker component (H), said crosslinker component (H) comprising water-dispersible polyisocyanates having aliphatically and/or cycloaliphatically and/or aromatically attached isocyanate groups and possibly containing from 0 to 20 parts by weight of an organic solvent.

Surprisingly it has been found that the hydrophobicization of the binder component that is brought about by means of the fluorinated side groups present in the oligourethane or polyurethane polymer does not lead to an increase in anionic hydrophilicization with salt groups (30-45 meq/100 g resin solids) and that the fully cured films have very low surface energies even with very low fluorine contents (from 0.5 to 5% by weight and preferably from 0.5 to 2.0% by weight, based on the resin solids).

In the two-component application it is also possible to incorporate the crosslinker component, particularly polyisocyanates without permanent hydrophilic modification, into the fully modified binder component very easily by means of simple emulsifying techniques: for example, by using a mechanical stirrer or by means of simple mixing of the two components by hand. This ensures fine, homogeneous distribution of the polyisocyanate droplets in the binder component.

The aqueous fluoromodified polyurethane system of the invention for anti-graffiti and antisoiling coatings is defined by a multistage preparation process. In reaction stage (a), first of all, a low-solvent or solvent-free binder component is prepared on the basis of an aqueous solution or dispersion of optionally hydroxy- and/or amino-functional oligomer- or polyurethanes having fluorinated side chains and this binder component is then optionally reacted further in reaction stage (b) with a crosslinker component based on water-dispersible polyisocyanates to give an aqueous, highly crosslinked two-component polyurethane coating system.

The binder component is prepared by means of a modified prepolymer mixing process, called the high solids process (HSP technology). High shear forces are unnecessary here, and so, for example, high-speed stirrers, dissolvers or rotor/stator mixers can be used.

To implement this process, employing the techniques customary in polyurethane chemistry, in reaction stage ($a_1$) from 2.5 to 12 parts by weight of a fluoromodified polyol component (A) (i), from 10 to 50 parts by weight of a high molecular mass polyol component (A) (ii), and optionally from 0 to 10 parts by weight of a low molecular mass polyol component (A) (iii) are reacted with from 2 to 30 parts by weight of a polyisocyanate component (B), with the addition of from 0 to 25 parts by weight of a solvent component (C), optionally in the presence of a catalyst, the reaction being carried out partially or completely, with some or all of the hydroxyl groups of components (A) (i), (A) (ii), and (A) (iii) being reacted with the isocyanate groups of component (B).

The preparation of the polyurethane preadduct in accordance with reaction stage ($a_1$) preferably takes place in a manner such that first of all component (B) is added within a period of a few minutes to component (A) (i), optionally in solution in component (C), and subsequently a mixture of components (A) (ii), (A) (iii), and, optionally (C), is added or metered in over a period ranging from a few minutes to a few hours or, alternatively, the mixture of components (A) (i), (A) (ii), (A) (iii), and, optionally, (C) is added or metered in to component (B) over a period ranging from several minutes to several hours. In order to reduce the viscosity it is possible to use small amounts of a solvent component (C) in reaction stage ($a_1$).

The fluoromodified polyol component (A)(i) contains two or more isocyanate-reactive hydroxyl groups and has an average molecular mass of 500-2000 daltons (number average). It is preferably composed of the reaction product or macromonomer of monofunctional fluoroalcohols, aliphatic and/or aromatic diisocyanates, and a dialkanolamine, especially diethanolamine. Fluoroalcohols which can be used include perfluoroalkyl alcohols having terminal methylene groups (hydrocarbon spacers) of the general formula

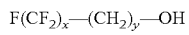

with x=4-20 and y=1-6 and also commercial mixtures of these (e.g. Zonyl® BA, Du Pont de Nemours) or hexafluoropropene oxide (HFPO) oligomer alcohols of the general formula

with z=1-10

(e.g. Krytox® Du Pont de Nemours) or else mixtures of both.

The fluoroalcohol is first added dropwise to the corresponding diisocyanate over a period of 30-60 minutes at a temperature between 0 and 30° C., with the addition of a catalyst and also of a suitable solvent, and is reacted in such a way that only one isocyanate group is reacted. In a further step the resultant preadduct is introduced dropwise into diethanolamine over the course of several minutes, with cooling.

Suitable solvents are, for example, N-methylpyrrolidone (NMP) or tetrahydrofuran.

Customary catalysts for polyaddition reactions with polyisocyanates are, for example, dibutyltin oxide, dibutyltin dilaurate (DBTL), triethylamine, tin(II) octoate, 1,4-diazabicyclo[2.2.2]octane (DABCO), 1,4-diazabicyclo[3.2.0]-5-nonene (DBN), and 1,5-diazabicyclo[5.4.0]-7-undecene (DBU).

The polyol component (A) (ii) is composed of a high molecular mass polyol having two or more polyisocyanate-reactive hydroxyl groups and an average molecular mass (number average) of from 500 to 6000 daltons. Suitable polymeric polyols which can be used include polyalkylene glycols, aliphatic or aromatic polyesters, polycaprolactones, polycarbonates, $\alpha,\omega$-polymethacrylatediols, $\alpha,\omega$-dihydroxyalkylpolydimethylsiloxanes, hydroxy-functional macromonomers, hydroxy-functional telecheles, hydroxy-functional epoxy resins or suitable mixtures thereof.

Suitable polyalkylene glycols are, for example, polypropylene glycols, polytetramethylene glycols or polytetrahydrofurans, hydrophobically modified polyether polymers composed of saponification-stable block copolymers with an ABA, BAB or $(AB)_n$ structure, in which A represents a polymer segment having hydrophobicizing properties and B a polymer segment based on polypropylene oxide, hydrophobically modified polyetherpolyols composed of saponification-stable block copolymers with an $A_1A_2A_3$ or $(A_1A_2)_n$ structure, in which A in each case represents polymer segments having hydrophobicizing properties, and hydrophobically modified random polyetherpolyols composed of saponification-stable random copolymers of at least one hydrophobic alkylene oxide and propylene oxide.

It is preferred to use linear or difunctional hydrophobically modified polyether polymers composed of saponification-stable block copolymers with an ABA, BAB or $(AB)_n$ structure, in which A represents a polymer segment having hydrophobicizing properties and B a polymer segment based on polypropylene oxide, having an average molecular mass (number average) of from 1000 to 3000 daltons.

Suitable aliphatic or aromatic polyesters are, for example, condensates based on 1,2-ethanediol or ethylene glycol and/or 1,4-butanediol or 1,4-butylene glycol and/or 1,6-hexanediol or 1,6-hexamethylene glycol and/or 2,2-dimethyl-1,3-propanediol or neopentyl glycol and/or 2-ethyl-2-hydroxymethyl-1,3-propanediol or trimethylolpropane and also 1,6-hexanedioic acid or adipic acid and/or 1,2-benzenedicarboxylic acid or phthalic acid and/or 1,3-benzenedicarboxylic acid or isophthalic acid and/or 1,4-benzenedicarboxylic acid or terephthalic acid and/or sodium 5-sulfoisophthalate and/or esters thereof, and also reaction products of epoxides and fatty acids. It is preferred to use linear or difunctional aliphatic or aromatic polyester polols having an average molecular mass (number average) of from 1000 to 3000 daltons.

Polycaprolactones based on $\epsilon$-caprolactone (CAPA grades, Solvay Interox Ltd.), polycarbonates based on dialkyl carbonates and glycols (Desmophen 2020, Bayer AG), and combinations (Desmophen C 200, Bayer AG) likewise belong to the polyesters group. It is preferred to use linear or difunctional types having an average molecular mass (number average) of from 1000 to 3000 daltons.

As $\alpha,\omega$-polymethacrylatediols (TEGO® Diol BD 1000, TEGO® Diol MD 1000 N, TEGO® Diol MD 1000 X, Tego Chemie Service GmbH) having a molecular mass of from 1000 to 3000 daltons and $\alpha,\omega$-dihydroxyalkylpolydimethylsiloxanes it is preferred to use linear or difunctional types having an average molecular mass (number average) of from 500 to 3000 daltons.

Component (A) (iii) is composed of a low molecular mass polyol having two or more polyisocyanate-reactive hydroxyl groups and an average molecular mass (number average) of from 50 to 499 daltons. As suitable low molecular mass polyols it is possible to use, for example, 1,2-ethanediol or ethylene glycol, 1,2-propanediol or 1,2-propylene glycol, 1,3-propanediol or 1,3-propylene glycol, 1,4-butanediol or 1,4-butylene glycol, 1,6-hexanediol or 1,6-hexamethylene glycol, 2-methyl-1,3-propanediol, 2,2-dimethyl-1,3-propanediol or neopentyl glycol, 1,4-bis(hydroxymethyl)cyclohexane or cyclohexanedimethanol, 1,2,3-propanetriol or glycerol, 2-hydroxymethyl-2-methyl-1,3-propanediol or trimethylolethane, 2-ethyl-2-hydroxymethyl-1,3-propanediol or trimethylolpropane, 2,2-bis(hydroxymethyl)-1,3-propanediol or pentaerythritol, or mixtures thereof. Preference is given to using 1,4-butanediol.

The polyisocyanate component (B) is composed of at least one polyisocyanate, polyisocyanate derivative or polyisocyanate homolog having two or more aliphatic or aromatic isocyanate groups. Particularly suitable are the polyisocyanates well known in polyurethane chemistry, or combinations thereof. As suitable aliphatic polyisocyanates it is possible to use, for example, 1,6-diisocyanatohexane (HDI), 1-isocyanato-5-isocyanatomethyl-3,3,5-trimethylcyclohexane or isophorone diisocyanate (IPDI), bis(4-isocyanatocyclohexyl)methane ($H_{12}$MDI), 1,3-bis(1-isocyanato-1-methylethyl)benzene (m-TMXDI) and/or technical-grade isomer mixtures of the individual aromatic polyisocyanates. As suitable aromatic polyisocyanates it is possible to use for example, 2,4-diisocyanatotoluene or toluene diisocyanate (TDI), bis(4-isocyanatophenyl)methane (MDI) and, optionally, its higher homologs (polymeric MDI), and/or technical-grade isomer mixtures of the individual aromatic polyisocyanates. Also suitable, in principle, furthermore, are the "paint polyisocyanates", as they are called, based on bis(4-isocyanatohexyl)methane ($H_{12}$MDI), 1,6-diisocyanatohexane (HDI), and 1-isocyanato-5-isocyanatomethyl-3,3,5-trimethylcyclohexane (IPDI). The term "paint polyisocyanates" characterizes derivatives of these diisocyanates that contain allophanate, biuret, carbodiimide, isocyanurate, uretdione and/or urethane groups and in which the residual monomeric diisocyanate content has been reduced to a minimum, in accordance with the state of the art. Besides these, it is also possible to use modified polyisocyanates obtainable, for example, by hydrophilic modification of "paint polyisocyanates" based on 1,6-diisocyanatohexane (HDI). The aliphatic polyisocyanates are preferred to the aromatic polyisocyanates. Furthermore, polyisocyanates having isocyanate groups differing in reactivity are preferred.

The NCO/OH equivalent ratio of components (A) and (B) is adjusted to a figure of from 1.2 to 2.5, preferably from 1.5 to 2.25.

Preference is given to using polyisocyanates containing isocyanate groups differing in reactivity, so as to give narrower molecular mass distributions with lower polydispersity. Accordingly, preference is given to polyurethane prepolymers with a linear structure, which are composed of difunctional polyol components and polyisocyanate components. The viscosity of the polyurethane prepolymers is preferably low and largely independent of the structure of the polyol and polyisocyanate components used.

The solvent components (C) is composed of an inert organic solvent. As suitable organic solvents it is possible, for example, to use low-boiling solvents, such as acetone and methyl ethyl ketone, or high-boiling solvents, such as N-methylpyrrolidone and dipropylene glycol dimethyl ether (Proglyde DMM®). Following preparation, the low-boiling organic solvents can be removed again, if desired, by redistillation. In accordance with one particularly preferred embodiment the polyurethane dispersion contains less than 10% by weight of organic solvents.

In the subsequent reaction stage ($a_2$) the partially or completely reacted polyurethane preadduct from stage ($a_1$) is reacted with from 1 to 10 parts by weight of a low molecular mass, anionically modifiable polyol component (A) (iv) and/or with from 0 to 20 parts by weight of a polymeric diol component (A) (v), optionally in the presence of a catalyst, to form the corresponding polyurethane prepolymer.

The preparation of the polyurethane prepolymer in reaction stage ($a_2$) preferably takes place in such a way that the finely ground polyol component (A) (iv) with an average particle size <150 μm and the polymeric diol component (A) (v) are added or metered in to the polyurethane preadduct from stage ($a_1$) within a period ranging from several minutes to several hours. Given a corresponding process regime and/or incomplete reaction, the polyurethane preadduct from stage ($a_1$) that is used in reaction stage ($a_2$) may possibly, alongside isocyanate groups and/or polyisocyanate monomers, contain hydroxyl groups which are still free.

Component (A) (iv) is composed of at least one low molecular mass, anionically modifiable polyol or polyamine having one or more polyisocyanate-reactive hydroxyl and/or amino groups and one or more polyisocyanate-inert carboxylic and/or sulfonic acid groups, some or all of which can be converted in the presence of bases into carboxylate and/or sulfonate groups or are already in the form of carboxylate and/or sulfonate groups, and having an average molecular mass of from 100 to 1000 daltons (number average). As low molecular mass, anionically modifiable polyols it is possible to use, for example, hydroxypivalic acid (trade name HPA, Perstorp Specialty Chemicals AB), 2-hydroxymethyl-3-hydroxypropanoic acid or dimethylolacetic acid, 2-hydroxymethyl-2-methyl-3-hydroxypropanoic acid or dimethylolpropionic acid (trade name Bis-MPA, Perstorp Specialty Chemicals AB), 2-hydroxymethyl-2-ethyl-3-hydroxypropanoic acid or dimethylolbutyric acid, 2-hydroxymethyl-2-propyl-3-hydroxypropanoic acid or dimethylolvaleric acid, citric acid, tartaric acid, [tris(hydroxymethyl)methyl]-3-aminopropanesulfonic acid (TAPS, Raschig GmbH), compounds based on 1,3-propane sulfone (Raschig GmbH) and/or 3-mercaptopropanesulfonic acid, sodium salt (trade name MPS, Raschig GmbH) or mixtures thereof. These compounds may optionally also contain amino groups in place of hydroxyl groups. Preference is given to bishydroxyalkanecarboxylic acids and/or bishydroxysulfonic acids and/or their alkali metal salts, having a molecular mass of from 100 to 499 daltons, and especially 2-hydroxymethyl-2-methyl-3-hydroxypropanoic acid or dimethylolpropionic acid (trade name DMPA® from Trimet Technical Products, Inc.).

Component (A) (v) is composed of from 0 to 20 parts by weight of a polymeric polyol component having two or more polyisocyanate-reactive hydroxyl groups and further, polyisocyanate-inert hydrophilic groups, such as, for example, polyethylene oxide segments, having an average molecular mass of from 500 to 5000 daltons (number average). It is preferred to use reaction products of poly(ethylene oxide[co/block/ran-propylene oxide]) monoalkyl ethers, a diisocyanate, and diethanolamine.

The reaction conditions for carrying out reaction stages ($a_1$) and ($a_2$) are not particularly critical. In reaction stages ($a_1$) and ($a_2$) the reaction mixture is stirred under inert gas atmosphere at preferably from 60 to 120° C., in particular from 80 to 120° C., utilizing the exothermic heat of the polyaddition reaction, until the calculated or theoretical NCO content is reached. The reaction times required are situated in the region of several hours and are decisively influenced by reaction parameters, such as the reactivity of the components, the stoichiometry of the components, and the temperature.

Components (A) and (B) in reaction stages ($a_1$) and/or ($a_2$) can be reacted in the presence of a catalyst customary for polyaddition reactions with polyisocyanates. Where needed, these catalysts are added in amounts of from 0.01 to 1% by weight, based on components (A) and (B). Customary catalysts for polyaddition reactions with polyisocyanates are, for example, dibutyltin oxide, dibutyltin dilaurate (DBTL), triethylamine, tin(II) octoate, 1,4-diazabicyclo[2.2.2]octane (DABCO), 1,4-diazabicyclo[3.2.0]-5-nonene (DBN), and 1,5-diazabicyclo[5.4.0]-7-undecene (DBU).

The anionically modifiable polyurethane prepolymer from reaction stage ($a_2$) is reacted in the subsequent reaction stage ($a_3$) fully or partly with 0 to 15 parts by weight of a polyfunctional chain terminator component (D) under conditions in which in each case only one reactive group or component (D) reacts with an isocyanate group of the polyurethane preadduct. Reaction stage ($a_3$) is preferably conducted at a temperature of from 60 to 120° C., in particular at from 80 to 100° C.

The chain terminator component (D) is composed preferably of one or more polyols, polyamines and/or polyamino alcohols having three or more isocyanato-reactive hydroxyl and/or primary and/or secondary amino groups and an average molecular mass of from 50 to 500 daltons (number average), of which one reacts with the polyurethane preadduct. As a suitable chain terminator component (D) it is possible to use, for example, diethanolamine, trimethylolpropane, ditrimethylolpropane, pentaerythritol, dipentaerythritol, carbohydrates and/or derivatives thereof. It is preferred to use aliphatic or cycloaliphatic polyols and/or polyamines and/or amino alcohols, and especially diethanolamine and/or trimethylolpropane.

The chain terminator component (D) is added in an amount such that the degree of chain termination, based on the free isocyanate groups of the polyurethane prepolymer, formed from components (A) and (B), is from 0 to 100 equivalent %.

The functionalized and anionically modifiable polyurethane oligomer or polymer from reaction stage ($a_3$), which has two or more reactive groups per chain end and a total functionality of $\geq 4$, is reacted in the subsequent reaction stage ($a_4$) with from 0.1 to 10 parts by weight of a neutralizing component (E) for partial or complete neutralization of the carboxylic and/or sulfonic acid groups (direct neutralization). Reaction stage ($a_4$) is conducted preferably at a temperature of from 40 to 65° C., in particular at around 50° C.

The neutralizing component (E) is composed of one or more bases, which serve to neutralize some or all of the carboxylic and/or sulfonic acid groups. Where component (A) (iv) is already in the form of its salts, there is no need for a neutralizing component (E). As suitable bases it is possible to use, for example, tertiary amines such as N,N-dimethylethanolamine, N-methyldiethanolamine, triethanolamine, N,N-dimethylisopropanolamine, N-methyldiisopropanolamine, triisopropylamine, N-methylmorpholine, N-ethylmorpholine, triethylamine, ammonia or alkali metal hydroxides such as lithium hydroxide, sodium hydroxide, and potassium hydroxide. It is preferred to use tertiary amines and especially triethylamine.

The neutralizing component (E) is added in an amount such that the degree of neutralization, based on the free carboxylic and/or sulfonic acid groups of the polyurethane oligomer or polymer formed from components (A), (B), and (D) is from 60 to 100 equivalent %, preferably from 80 to 95 equivalent %. With neutralization, carboxylate and/or sulfonate groups are formed from the carboxylic and/or sulfonic acid groups, and serve for the anionic modification or stabilization of the polyurethane dispersion.

The functionalized and anionically modified polyurethane oligomer or polymer from reaction stage ($a_4$) is dispersed in the subsequent reaction stage ($a_5$) in from 40 to 120 parts by weight of water, which can additionally contain from 0 to 50 parts by weight of a formulating component (F) (in situ formulation). Reaction stage ($a_5$) is preferably conducted at a temperature of from 30 to 50° C., in particular at around 40° C. Where needed, the water, which can additionally contain the formulating component (F), can also be dispersed into the polyfunctional, anionically modified polyurethane oligomer or polymer.

Reaction stages ($a_4$) and ($a_5$) can also be integrated with one another such that component (E) is added to the water prior to dispersing (indirect neutralization). If required it is also possible to employ a combination of direct and indirect neutralization.

In another embodiment the solids content of the only partly chain-terminated polyurethane oligomer or polymer from stage ($a_5$) comprising said components (A), (B), (D), (E), and (G) is adjusted to from 35 to 60% by weight, based on the total amount of an aqueous binder component comprised of components (A) to (E) and (G) by weight.

On dispersing, the polyurethane prepolymer is transferred to the dispersing medium and forms an aqueous solution or dispersion of optionally hydroxy- and/or amino-functional oligo- or polyurethanes. The anionically modified polyurethane oligomer or polymer either forms micelles, which have stabilizing carboxylate and/or sulfonate groups on the surface and reactive isocyanate groups inside, or is in solution in the aqueous phase. All cationic counterions to the anionic carboxylate and/or sulfonate groups are in solution in the dispersing medium. The terms "dispersing" and "dispersion" comprehend the possibility of solvated and/or suspended components being present as well as dispersed components with a micellar structure.

The hardness of the water used is immaterial to the process, and, consequently, the use of distilled or demineralized water is unnecessary. Higher levels of hardness result in a further reduction in the water absorption of the aqueous, highly crosslinked two-component polyurethane coating systems, without adversely affecting their material properties.

The formulating component (F) comprises defoamers, devolatilizers, lubricant and leveling additives, radiation curing additives, dispersing additives, substrate wetting additives, hydrophobicizers, rheological additives, such as polyurethane thickeners, coalescence aids, flatting agents, adhesion promoters, antifreeze agents, antioxidants, UV stabilizers, bactericides, fungicides, further polymers and/or polymer dispersions, and fillers, pigments, flatting agents or a suitable combination thereof. The individual formulating ingredients are to be regarded as inert.

In the subsequent reaction stage ($a_6$), the functionalized and anionically modified polyurethane oligomer or polymer from reaction stage ($a_5$), which may be only partly chain-terminated, is reacted with from 0 to 10 parts by weight of a chain extender component (G). Reaction stage ($a_6$) is preferably conducted at a temperature of from 30 to 50° C., in particular at around 40° C.

Reaction stages ($a_5$) and ($a_6$) may also be integrated with one another such that component (G) is added to the water prior to dispersing.

The chain extender component (G) is composed of a polyamine having two or more polyisocyanate-reactive amino groups and an average molecular mass of from 50 to 500 daltons (number average). As suitable polyamines it is possible to use, for example, adipic dihydrazide, ethylenediamine, diethylenetriamine, triethylenetetramine, tetraethylenepentamine, pentaethylenehexamine, dipropylenetriamine, hexamethylenediamine, hydrazine, isophoronediamine, N-(2-aminoethyl)-2-aminoethanol, adducts of salts of 2-acrylamido-2-methylpropane-1-sulfonic acid (AMPS®) and ethylenediamine, adducts of salts of (meth)acrylic acid with ethylenediamine, adducts of 1,3-propane sulfone and ethylenediamine, or any desired combinations of these polyamines. It is preferred to use difunctional primary amines, and especially ethylenediamine.

The chain extender component (G) is added in an amount such that the degree of chain extension, based on the free isocyanate groups of the polyurethane oligomer or polymer formed from components (A), (B), (D), and (E), is from 0 to 95 equivalent %. The chain extender component (G) can be diluted in pre-withdrawn fractions of the water, in a weight ratio from 1:1 to 1:10, in order to suppress the additional exothermic heat by the hydration of the amines.

The (partial) chain extension leads to an increase in the molecular mass of the polyurethane oligomer or polymer. The chain extender component (G) reacts with reactive isocyanate groups substantially more rapidly than water. In the following reaction stage ($a_6$) any remaining free isocyanate groups are fully chain-extended with water.

The solids content in terms of polyurethane oligomer or polymer composed of components (A), (B), (D), (E) and (G) is adjusted to from 35 to 60% by weight, preferably from 40 to 50% by weight, based on the total amount of the aqueous binder component composed of components (A) to (E) and (G).

The average particle size of the micelles of the aqueous binder component composed of components (A) to (E) and (G) is preferably from 10 to 300 nm.

The average molecular mass of the polyurethane oligmer or polymer composed of components (A), (B), (D), (E) and (G) is preferably from 2000 to 20000 daltons (number average).

The carboxylate and/or sulfonate group content of the polyurethane oligomer or polymer composed of components (A), (B), (D), (E) and (G) is adjusted preferably to from 10 to 45 meq·(100 g)$^{-1}$, especially preferably to from 15 to 30 meq·(100 g)$^{-1}$.

The binder component is in the form of a dispersion or molecularly disperse solution of optionally hydroxy- and/or amino-functional oligourethanes and/or polyurethanes which are dilutable with water and are situated within a pH range from 6 to 9. They may optionally additionally contain further water-dilutable organic polyhydroxy compounds, such as water-soluble alcohols having more than two hydroxyl groups, e.g., glycerol, trimethylolpropane, 1,2,3-butanetriol, 1,2,6-hexanetriol, pentaerythritol or sugars, as a result of which it is possible to carry out corresponding modification of the technical coatings properties of the cured coating.

These dispersions of solutions are stabilized by the presence of ionically hydrophilic groups, such as carboxylate, sulfonate or other hydrophilic groups, for example, which are obtained by neutralizing some or all of the corresponding acid groups.

Optionally, finally, in reaction stage (b), the binder component from reaction stage ($a_5$) or ($a_6$) is reacted with the optionally hydrophilically modified crosslinker component (H), preferably in a ratio of from 3:1 to 5:1 (based on the respective weight), the crosslinker component (H) being added to the binder component to give, following application, a highly crosslinked anti-graffiti and anti-soiling polyurethane coating system. Reaction stage (b) is preferably conducted at a temperature of from 20 to 40° C., in particular at around 20° C.

The crosslinker component (H) is composed of water-dispersible polyisocyanates having aliphatically and cycloaliphatically and/or aromatically attached isocyanate groups and containing from 0 to 20 parts by weight of an organic solvent. The aliphatic polyisocyanates are preferred to the aromatic polyisocyanates. Particularly suitable are the "paint polyisocyanates" well known in polyurethane chemistry, based on bis(4-isocyanatocyclohexyl)methane ($H_{12}$MDI), 1,6-diisocyanatohexane (HDI), 1-isocyanato-5-isocyanatomethyl-3,3,5-trimethylcyclohexane (IPDI) or combinations thereof. The term "paint polyisocyanates" characterizes derivatives of these diisocyanates which contain allophanate, biuret, carbodiimide, isocyanurate, uretdione and/or urethane groups and in which the residual monomeric diisocyanate content has been reduced to a minimum in accordance with the state of the art. Besides these it is also possible to use hydrophilically modified polyisocyanates obtainable, for example, by reacting "paint polyisocyanates" with polyethylene glycol. As suitable polyisocyanates it is possible to use, for example, commercial HDI isocyanurates without (trade name Rhodocoat WT 2102, Rhodia AG) or with hydrophilic modification (trade name Basonat P LR 8878, BASF AG, trade name Desmodur DA or Bayhydur 3100 from Bayer AG.

To prepare the ready-to-use aqueous fluoromodified two-component polyurethane coating composition the crosslinker components (H) ("curing agent", part B) is mixed shortly before application into the binder component comprising components (A) to (G) ("stock varnish", part A). In order to obtain trouble-free emulsification it is advisable to dilute the polyisocyanates with small amounts of organic solvents, such as dipropylene glycol dimethyl ether (Proglyde DMM®), butyl (di)glycol acetate or butyl acetate, for example. Simple emulsifying techniques, operating for example with a mechanical stirring mechanism (drill with stirrer), are generally sufficient to bring about homogeneous distribution of the components. The amounts of binder component and of the crosslinker component are such that the NCO/(OH+NH$_{(2)}$) equivalent ratio of the isocyanate groups of the crosslinker component and of the hydroxyl and/or amino groups of the binder component is adjusted to from 1.1 to 1.6, preferably from 1.2 to 1.4.

In this way it is possible to obtain transparent scratchproof coatings having very low surface energies and, owing to a high crosslinking density, having outstanding properties. This applies both to the processing properties and to the surface properties and mechanical properties, in conjunction with very good solvent resistance and chemical resistance. Because of the fluorinated side chains and the comparatively low hydrophilic group content of the binder component, the coatings additionally feature excellent water resistance.

The aqueous, highly crosslinked anti-graffiti and anti-soiling polyurethane coating system of the invention is applied by the methods known from coating technology, such as flow coating, pouring, knife coating, rolling, spraying, brushing, dipping, and roller coating, for example.

The drying and curing of the coatings take place generally at standard (exterior and interior) temperatures in the range from 5 to 40° C., i.e., without special heating of the coating, though depending on the particular utility may also take place at higher temperatures in the range from 40 to 100° C.

The present invention further provides for the use of the aqueous, highly crosslinked and anti-graffiti and anti-soiling polyurethane coating of the invention in the construction sector or in the industrial sector in the form of formulated or unformulated, chemically stable and lightfast paint and/or coating systems for the surfaces of mineral building materials, such as concrete, plaster, ceramic, clay, and cement, for example, and also for the surfaces of glass, rubber, wood and wood-based materials, plastic, metal, paper, composites or leather.

The aqueous, highly crosslinked anti-graffiti and anti-soiling polyurethane coating systems proposed in accordance with the invention are also suitable, individually or in combination, for the construction of systems for

| | |
|---|---|
| (α) | dirt-repellent anti-graffiti coatings on plastic, wood or metal for traffic signs or rail wagons, for example, |
| (β) | dirt-repellent coatings of rotors for wind power plants, |
| (γ) | dirt-repellent interior floor coverings and exterior ground coverings. |

The surface energy of a dried film produced on the basis of a coating system according to the invention is preferably less than 18.6 mN/m, the literature value for Teflon®.

The examples which follow are intended to illustrate the invention in more detail.

EXAMPLES

Example 1

Fluoromodified Diol Component (T-Bone)

A four-necked flask equipped with KPG stirrer, reflux condenser, internal thermometer and nitrogen blanketing was charged with 0.1 mol of 2,4-tolylene diisocyanate (TDI) (Desmodur T 80, Bayer AG) in solution in 28.8 g of N-methylpyrrolidone (NMP) under nitrogen blanketing and this initial charge was cooled to about 15-20° C. Crystallization of 2,4-tolylene diisocyanate (TDI) ought to be avoided without fail. Following the addition of 2 drops of dibutyltin dilaurate (DBTL) catalyst, an equimolar amount of fluoroalcohol (e.g., Zonyl® BA, Du Pont de Nemours) was added slowly dropwise over the course of about 1 h, with cooling. After the end of the dropwise addition the mixture was stirred at the same temperature for 1 h until the desired NCO value was reached. The preadduct was subsequently added slowly dropwise with cooling to an equimolar amount of diethanolamine (DEA) in the form of a mixture with 3.0 g of N-methylpyrrolidone (NMP).

The reaction is at an end when the NCO value has dropped to zero.

Example 2

Hydroxy-functional Fluoromodified Polyurethane Dispersion Based on Polycarbonate In a four-necked flask equipped with KPG stirrer, reflux condenser, thermometer and nitrogen blanketing a mixture of 12.36 g of fluoromodified diol component (see example 1; contains 3.71 g of N-methylpyrrolidone (NMP)) and 49.72 g of isophorone diisocyanate (Vestanat® IPDI, Degussa AG) was stirred in the presence of 0.1 g of dibutyltin dilaurate (DBTL) catalyst at 80-90° C. under nitrogen blanketing for 1.5 h. Following the addition of 8.40 g of dimethylolpropionic acid (DMPA®), 100.00 g of a polycarbonatediol having a hydroxyl number of 56 mg KOH·g$^{-1}$ (Desmophen® C 200, Bayer AG) and 26.29 g of N-methylpyrrolidone (NMP) to the preadduct the mixture was stirred further at 80-90° C. under nitrogen blanketing for about 50 min until the calculated NCO content was reached (theoretical: 4.24% by weight). The course of the reaction was monitored by acidimetry.

The prepolymer was then dispersed with intensive stirring in 233.48 g of water, to which 6.02 g of triethylamine (TEA) had been added (indirect neutralization), and was subsequently chain-extended with 16.57 g of N-(2-aminoethyl)-2-aminoethanol (50% strength aqueous solution).

This gave a stable polyurethane dispersion having the following characteristics:

| Characteristics | Milky-white liquid |
|---|---|
| Solids content | 40% by weight |
| Charge density | 34.57 meq · (100 g)$^{-1}$ |
| Fluorine content | 2.0% by weight |

Example 3

Aqueous Fluoromodified Two-component Polyurethane Coating System Based on Example 2

Incorporation of Rhodocoat WT 2102, mixed (9:1) beforehand with dipropylene glycol dimethyl ether (Proglyde DMM®) using a mechanical stirrer, gives a two-component polyurethane clearcoat material having an NCO/OH equivalent ratio of 1.3.

| Component | Parts by weight | Description |
|---|---|---|
| PART A | | |
| Example 2 | 991.00 | polyurethane dispersion |
| Byk 024 | 3.00 | defoamer |
| Tego Wet 500 | 3.00 | wetting agent |
| Edaplan LA 413 | 3.00 | leveling additive |
| Total: | 1 000.00 | stock varnish |
| PART B | | |
| Rhodocoat WT 2102 | 50.00 | water-dispersible polyisocyanate |
| Proglyde ® DMM | 5.56 | solvent |
| Total: | 55.56 | curing agent |

Example 4

Hydroxy-functional Fluoromodified Oligourethane Dispersion, Chain-terminated with Trimethylolpropane (TMP)

In a four-necked flask equipped with KPG stirrer, reflux condenser, thermometer and nitrogen blanketing a mixture of 12.15 g of fluoromodified diol component (see example 1; contains 3.65 g of N-methylpyrrolidone (NMP)), 100.00 g of a polycarbonatediol having a hydroxyl number of 56 mg KOH·g$^{-1}$ (Desmophen® C 200, Bayer AG) and 43.55 g of isophorone diisocyanate (Vestanat® IPDI, Degussa AG) was stirred in the presence of 0.1 g of dibutyltin dilaurate (DBTL) catalyst at 80-90° C. under nitrogen blanketing for 2.0 h. Following the addition of 4.90 g of dimethylolpropionic acid (DMPA®) in solution in 11.35 g of N-methylpyrrolidone (NMP) to the preadduct, the mixture was stirred further at 80-90° C. under nitrogen blanketing until the calculated NCO content was reached (theoretical: 4.18% by weight). The course of the reaction was monitored by acidimetry. Subsequently, 26.30 g of trimethylolpropane in solution in 25.00 g of N-methylpyrrolidone (NMP) were added and the mixture was stirred at 80-90° C. for 4 h more until the NCO value had dropped to zero. After cooling to 60° C., the prepolymer was neutralized directly with 3.33 g of triethylamine (TEA). The prepolymer was then dispersed in 240.00 g of water with intensive stirring.

This gave a stable oligourethane dispersion having the following characteristics:

| Characteristics | Semitranslucent liquid |
|---|---|
| Solids content | 40% by weight |
| Charge density | 19.57 meq · (100 g)$^{-1}$ |
| Fluorine content | 2.0% by weight |

Example 5

Aqueous Fluoromodified Two-component Polyurethane Coating System (Highly Crosslinked) Based on Example 4

Incorporation of Rhodocoat WT 2102, mixed (9:1) beforehand with dipropylene glycol dimethyl ether (Proglyde DMM®) using a mechanical stirrer, gives a two-component polyurethane clearcoat material having an NCO/OH equivalent ratio of 1.1.

| Component | Parts by weight | Description |
|---|---|---|
| PART A | | |
| Example 4 | 991.00 | oligourethane dispersion |
| Byk 024 | 3.00 | defoamer |
| Tego Wet 500 | 3.00 | wetting agent |
| Edaplan LA 413 | 3.00 | leveling additive |
| Total: | 1 000.00 | stock varnish |
| PART B | | |
| Rhodocoat WT 2102 | 202.40 | water-dispersible polyisocyanate |
| Proglyde ® DMM | 22.49 | solvent |
| Total: | 224.89 | curing agent |

Example 6

Fluoromodified Polyurethane Dispersion Based on Polyester

In a four-necked flask equipped with KPG stirrer, reflux condenser, thermometer and nitrogen blanketing a mixture of 12.43 g of fluoromodified diol component (see example 1; contains 3.73 g of N-methylpyrrolidone (NMP)) and 102.16 g of isophorone diisocyanate (Vestanat® IPDI, Degussa AG) was stirred in the presence of 0.1 g of dibutyltin dilaurate (DBTL) catalyst at 80-90° C. under nitrogen blanketing for 1.5 h. Following the addition of 14.00 g of 1,4-butanediol, 15.00 g of dimethylolpropionic acid (DMPA®), 100.00 g of a polyester diol having a hydroxyl number of about 56.1 mg KOH·g$^{-1}$ (Bester® 42 H, Poliolchimica S.p.A.), all in solution in 46.27 g of N-methylpyrrolidone (NMP), the mixture was stirred further at 80-90° C. under nitrogen blanketing for one hour more until the calculated NCO content was reached (theoretical: 3.81% by weight). The course of the reaction was monitored by acidimetry.

The prepolymer was then dispersed with intensive stirring in 341.41 g of water, to which 11.32 g of triethylamine (TEA) had been added (indirect neutralization), and was subsequently chain-extended with 33.12 g of ethylenediamine (16.7% strength aqueous solution).

This gave a stable polyurethane dispersion having the following characteristics:

| Characteristics | Semitranslucent liquid |
|---|---|
| Solids content | 38% by weight |
| Charge density | 43.55 meq · (100 g)$^{-1}$ |
| Fluorine content | 1.5% by weight |

Surface Energies of Cured Films of the Aqueous Fluoromodified Polyurethane Coating Systems of the Invention The aqueous fluoromodified two-component polyurethane coatings, in accordance with examples 3, 5, and 6, were drawn down using doctor blade applicators onto glass plates (wet film thickness 150 μm) and the films were subsequently dried at room temperature. After 7 days they were determined by means of the sessile drop method, with the contact angles of a series of apolar liquids (hexadecane, dodecane, decane and octane) on the film surfaces being measured.

The test results are set out in the following table.

| | Ex. 3 | Ex. 5 | Ex. 6 | Comparative dispersion (not modified) |
|---|---|---|---|---|
| Film transparency | clear | clear | clear | clear |
| Surface energy of a dried film [mN/m] | 15.8 | 19.6 | 21.7 | 44.3 |

The invention claimed is:

1. An aqueous fluoromodified polyurethane system for one- or two-component anti-graffiti and anti-soiling coatings, prepared by the process comprising the steps of:
 (a) preparing a binder component comprising an aqueous solution or dispersion of at least one of an optionally hydroxyl- or amino-functional oligo- or polyurethane having fluorinated side chains, by
 (a$_1$) reacting from 2.5 to 12 parts by weight of a fluoromodified polyol component (A)(i) having two or more isocyanate-reactive hydroxyl groups and a molecular mass of from 500 to 2,000 daltons, wherein component (A)(i) is at least one of a reaction product or a macromonomer of a monofunctional fluoroalcohol, an aliphatic diisocyanate, an aromatic diisocyanate, or both an aliphatic diisocyanate and an aromatic diisocyanate, and a diethanolamine, wherein the fluoroalcohol is a perfluoroalkyl alcohol having methylene groups of the formula

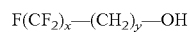

F(CF$_2$)$_x$—(CH$_2$)$_y$—OH with x=4-20 and y=1-6
 or hexafluoropropene oxide (HFPO) oligomer alcohol of the formula CF$_3$CF$_2$CF$_2$O—(CF(CF$_3$)CF$_2$O)$_z$—CF(CF$_3$)CH$_2$—OH,
 wherein z is from 1 to 10
 or a mixture thereof, from 10 to 50 parts by weight of a high molecular mass polyol component (A)(ii) having two or more polyisocyanate-reactive hydroxyl groups and a molecular mass of from 500 to 6,000 daltons, and from 0 to 10 parts by weight of a low molecular mass polyol component (A)(iii) having two or more polyisocyanate-reactive hydroxyl groups and a molecular mass of from 50 to 499 daltons with from 2 to 30 parts by weight of a polyisocyanate component (B) comprising at least one polyisocyanate having two or more aliphatic or aromatic isocyanate groups or a paint polyisocyanate, and adding from 0 to 25 parts by weight of a solvent component (C) composed of an inert organic solvent, optionally in the presence of a catalyst, to yield a polyurethane preadduct;
 (a$_2$) reacting the polyurethane preadduct from stage (a$_1$), optionally in the presence of a catalyst, with from 0.1 to 10 parts by weight of a low molecular mass, anionically modifiable polyol component or polyamine component (A) (iv) having two or more polyisocyanate-reactive hydroxyl groups, amino groups or a combination thereof and one or more inert carboxylic or sulfonic acid groups, some or all of which are optionally converted by means of bases into at least one of carboxylate or sulfonate groups, respectively, or are already in the form of at least one of carboxylate or sulfonate groups, having a molecular mass of from 100 to 1,000 daltons or with from 0.1 to 20 parts by weight of a polymeric polyol component (A)(v) having two or more polyisocyanate-reactive hydroxyl groups and further, polyisocyanate-inert, hydrophilic groups, having a molecular mass of from 500 to 5,000 daltons, to form a polyurethane prepolymer containing free isocyanate groups;

($a_3$) optionally reacting the polyurethane prepolymer from stage ($a_2$) such that some or all of the free isocyante groups are reacted with from 0.1 to 15 parts by weight of a chain terminator component (D) having three or more isocyanato-reactive hydroxyl groups, primary amino groups, secondary amino groups, or a combination thereof that react with the free isocyanate groups of the polyurethane prepolymer from stage ($a_2$) and wherein component (D) has a molecular mass of from 50 to 500 daltons, to yield a polyfunctional polyurethane oligomer or polymer that is chain terminated or partly chain terminated;

($a_4$) admixing the polyfunctional polyurethane oligomer or polymer that is chain terminated or partially chain terminated from stage ($a_3$) with from 0.1 to 10 parts by weight of a neutralizing component (E) to neutralize some or all of the acid groups to form a neutralized polyurethane oligomer or polymer, and then ($a_5$) dispersing the neutralized polyurethane oligomer or polymer that is chain terminated or partially chain terminated from stage ($a_4$) in from 40 to 120 parts by weight of water to yield a dispersion of neutralized polyurethane oligomer or polymer, wherein said dispersion of the neutralized polyurethane oligomer or polymer optionally contains from 0 to 50 parts by weight of a formulating component (F), and ($a_6$) optionally reacting the neutralized polyurethane oligomer or polymer that is partially chain terminated from stage ($a_5$) with from 0 to 10 parts by weight of a chain extender component (G) having three or more isocyanato-reactive primary amino groups, secondary amino groups, or a combination thereof and a molecular mass of from 50 to 500 daltons, to yield a polyurethane oligomer or polymer having at least one extended chain;

and, optionally, (b) subsequently reacting the binder component prepared in stage ($a_5$) or stage ($a_6$) with from 20 to 100 parts by weight of a crosslinker component (H), wherein said crosslinker component (H) comprises a water-dispersible polyisocyanate having at least two of an aliphatically, cycloaliphatically or aromatically attached isocyanate groups and optionally containing from 0 to 20 parts by weight of an organic solvent.

2. The polyurethane system of claim 1, wherein the high molecular mass polyol component (A) (ii) comprises a polyether, polyester, polycaprolactone, polycarbonate-polyol or an α, ω-polymethacrylatediol, or a combination thereof.

3. The polyurethane system of claim 2, wherein component A(ii) is a linear, difunctional polyester, polycaprolactone or a polycarbonate-polyol having a molecular mass of from 1,000 to 3,000 daltons.

4. The polyurethane system of claim 1, wherein component (A)(iii) is at least one alcohol selected from the group consisting of 1,4-butanediol, 2-methyl-1,3-propanediol and neopentyl glycol.

5. The polyurethane system of claim 1, wherein component (A) (iv) is a bishydroxyalkanecarboxylic acid, bishydroxysulfonic acid, or an alkali metal salt thereof having a molecular mass of from 100 to 1,000 daltons.

6. The polyurethane system of claim 5, wherein the bishydroxyalkanecarhoxylic acid is 2-hydroxymethyl-2-methyl-3-hydroxypropionic or dimethylolpropionic acid.

7. The polyurethane system of claim 1, wherein component (A)(v) is a reaction product of poly(ethylenc oxide [co/block/ran-propylene oxide]) monoalkyl ethers, a diisocyanate, and diethanolamine.

8. The polyurethane system of claim 1, wherein the polyfunctional chain terminator component (D) is an aliphatic polyol, a cycloaliphatic polyol, a polyamine or amino alcohol.

9. The polyurethane system of claim 8, wherein said polyfunctional chain terminator component (D) is selected from the group consisting of diethanolamine, trimethylolpropane, pentaerythritol and a carbohydrate.

10. The polyurethane system of claim 1, wherein the NCO/OH equivalent ratio of components (A) and (B) has a value of from 1.2:1 to 2.5:1.

11. The polyurethane system of claim 1, wherein said crosslinker component (H) water-dispersible polyisocyanate having aliphatically, cycloaliphatically or aromatically attached isocyanate groups are used which contain from 0 to 20 parts by weight of an organic solvent.

12. The polyurethane system of claim 1, wherein reaction stages ($a_1$) and ($a_2$) are conducted in the presence of from 0.01 to 1% by weight, based on components (A) and (B), of a catalyst for polyaddition reactions with polyisocyanates.

13. The polyurethane system of claim 1, wherein the neutralizing component (E) is added in an amount such that the degree of neutralization, based on the free carboxylic or sulfonic acid groups of the polyurethane oligomer or polymer formed from components (A), (B), (D), (E), and (G), is from 60 to 100 equivalent %.

14. The polyurethane system of claim 1, wherein the chain terminator component (D) is added in an amount such that the level of chain termination, based on the free isocyanate groups of the polyurethane preadduct formed from components (A) and (B) in stage ($a_1$), is from 0 to 100 equivalent %.

15. The polyurethane system of claim 1, wherein the chain extender component (G) is added in an amount such that the degree of chain extension, based on the free isocyanate groups of the neutralized polyurethane oligomer or polymer formed from components (A), (B), (D), and (E) in stage ($a_4$), is from 0 to 95 equivalent %.

16. The polyurethane system of claim 1, wherein the solids content in terms of polyurethane oligomer or polymer composed of components (A), (B), (D), (E), and (G) is adjusted to from 35 to 60% by weight, based on the total amount of an aqueous binder component composed of (A) to (E) and (G).

17. The polyurethane system of claim 1, wherein said polyurethane oligomer or polymer having at least one extended chain comprising said components (A), (B), (C), (D), (E) and (G) form micelles having an average particle size of from 10 to 300 nm.

18. The polyurethane system of claim 1, wherein the polyurethane oligomer or polymer comprising components (A), (B), (D), (E), and (G) has an average molecular mass of from 2,000 to 100,000 daltons.

19. The polyurethane system of claim 1, wherein the ratio of crosslinker component (H) to the binder component formed from components (A) to (E) or (A) to (F) is from 1:3 to 1:5 by weight.

20. A process for preparing the aqueous polyurethane system of claim 1 comprising:
($a_1$) reacting components (A) (i), (A) (ii), (A) (iii), (B) and (C), optionally in the presence of a catalyst, to form a polyurethane preadduct,
($a_2$) reacting the polyurethane preadduct from reaction stage ($a_1$) with components (A) (iv) and (A) (v),
($a_3$) optionally reacting the anionically modifiable polyurethane prepolymer from reaction stage ($a_2$) with component (D)), in each case only one reactive group of component (D) reacting with an isocyanate group of the polyurethane preadduct,
($a_4$) reacting the functionalized and anionically modifiable polyurethane oligomer or polymer from reaction stage ($a_3$), which optionally has two or more reactive groups per chain end and a total functionality of >4, with component (E) for complete or partial neutralization, and subsequently
($a_5$) dispersing the functionalized and anionically modified polyurethane oligomer or polymer from reaction stage ($a_4$) in water, which optionally additionally comprises component (F), to yield a chain terminated or partially chain terminated, functionalized, and anionically modified polyurethane oligomer or polymer,
($a_6$) optionally reacting the partially chain terminated, functionalized, and anionically modified polyurethane oligomer or polymer from stage ($a_5$) with component (G), and optionally
(b) reacting the binder component from reaction stage ($a_5$) or reaction stage ($a_6$) with the crosslinker component (H), the crosslinker component (H) being added to the binder component and, following application, a crosslinked anti-graffiti and anti-soiling coating system being obtained.

21. The process of claim 20, wherein stages ($a_4$) and ($a_5$) are integrated with one another such that component (E) is added to the water prior to dispersing.

22. The process of claim 20, wherein stages ($a_5$) and ($a_6$) are integrated with one another such that component (G) is added to the water prior to dispersing.

23. The process of claim 20, wherein reaction stages ($a_1$) to ($a_3$) are conducted at a temperature of from 60 to 120° C.

24. The process of claim 20, wherein reaction stage ($a_4$) is conducted at a temperature of from 40 to 65° C.

25. The process of claim 20, wherein reaction stages ($a_5$) and ($a_6$) are conducted at from 30 to 50° C.

26. The process of claim 20, wherein reaction stage (b) is conducted at a temperature of from 20 to 40° C.

27. A mineral building material comprising the aqueous fluoromodifled one- or two-component polyurethane system of claim 1.

28. The mineral building material of claim 27, wherein the polyurethane system is provided in a system for dirt-repellent anti-graffiti coatings on plastic, wood or metal.

29. The polyurethane system of claim 1, wherein said formulating component (F) comprises at least one member selected from the group consisting of a defoamer, a devolatilizer, a lubricant and leveling additive, a radiation curing additive, a dispersing additive, a substrate wetting additive, a hydrophobicizing agent, a rheological additive, a coalescence aid, a flatting agent, an adhesion promoter, an antifreeze agent, an antioxidant, a UV stabilizer, a bactericide, a fungicide, a further polymer, a further polymer dispersion, a filler, a pigment, and a flatting agent.

* * * * *